May 19, 1970     R. L. ELDER ET AL     3,512,237
ROTARY GRID FOR COTTON CLEANER
Original Filed May 29, 1967     2 Sheets-Sheet 1
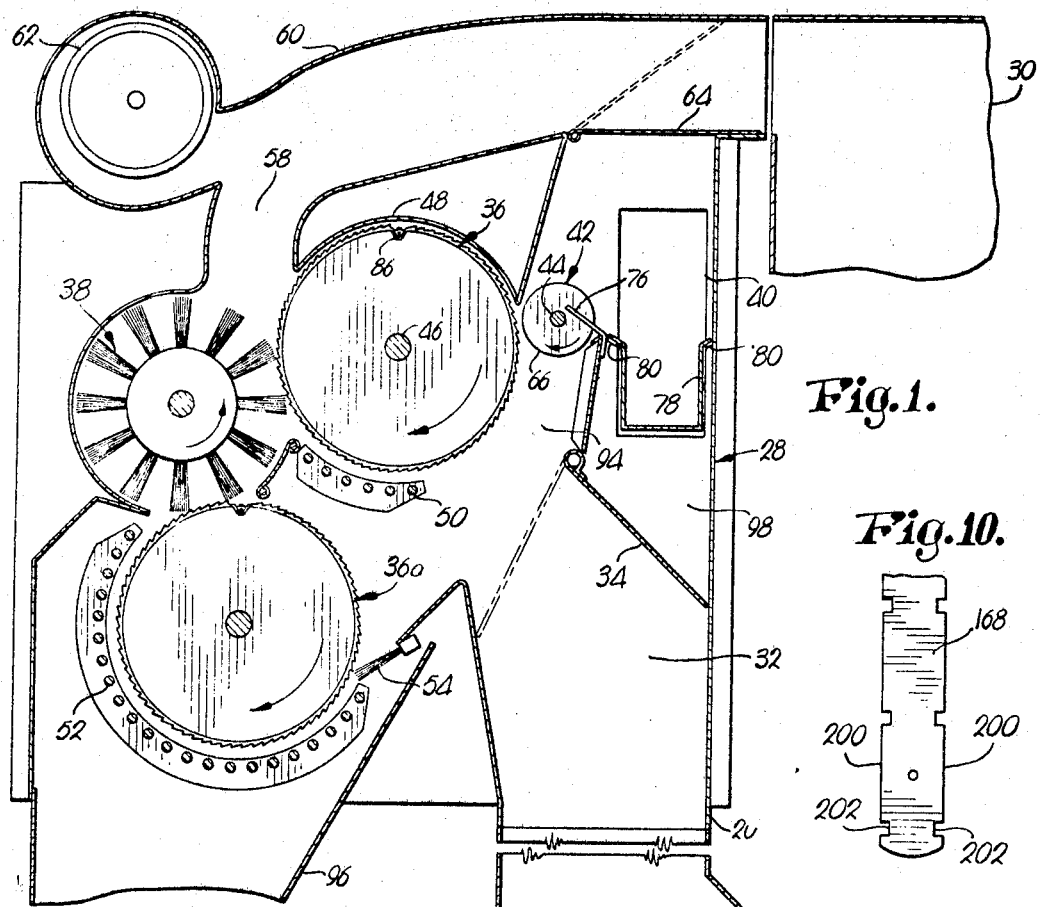
Fig.1.
Fig.10.
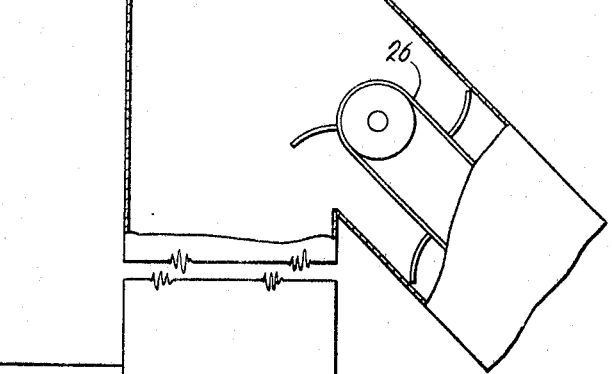
Fig. 4.
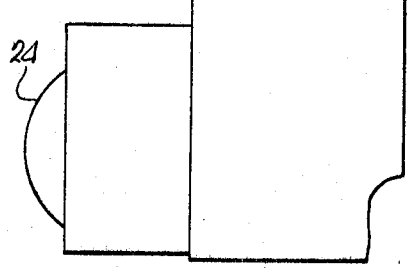
Fig. 8.
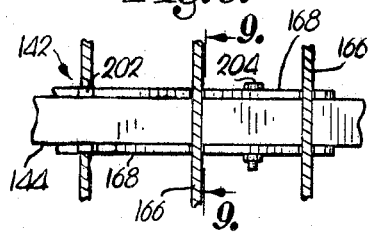
INVENTORS.
Robert L. Elder
Roger C. Hamm
Dean P. Brooks
BY
ATTORNEYS.

May 19, 1970 R. L. ELDER ET AL 3,512,237
ROTARY GRID FOR COTTON CLEANER
Original Filed May 29, 1967 2 Sheets-Sheet 2

INVENTORS.
Robert L. Elder
Roger C. Hamm
Dean P. Brooks
BY Schmidt, Johnson, Hovey,
Williams & Bradley
ATTORNEYS.

United States Patent Office 3,512,237
Patented May 19, 1970

3,512,237
ROTARY GRID FOR COTTON CLEANER
Robert L. Elder, Roger C. Hamm, and Dean P. Brooks, Newton, Kans., assignors to Hesston Corporation, Inc., Hesston, Kans., a corporation of Kansas
Original application May 29, 1967, Ser. No. 641,775. Divided and this application Aug. 5, 1968, Ser. No. 768,941
Int. Cl. B60b 7/04
U.S. Cl. 29—125                                    5 Claims

ABSTRACT OF THE DISCLOSURE

A rotary grid-barrier including a plurality of apertured plate elements, spacedly arranged along the axial extent of a shaft passing therethrough and maintained thereat by a transversely slotted, resilient sleeve element which is longitudinally coextensive with the elements and shaft and disposed therebetween and which receives a respective one of the elements in each slot.

---

This is a division of our co-pending application Ser. No. 641,775 filed May 29, 167, now abandoned.

It is the primary object of the instant invention to provide a combined cotton harvester and cleaner which utilizes an airstream for the dual purpose of delivering the harvested crop to the cleaner and directly foreign matter to the atmosphere.

Another important object of the present invention is to provide an implement of the kind just above described which includes a novel ararngement for exhausting the air to the atmosphere after it delivers the harvested crop to the cleaner so that the cotton and the foreign matter separated therefrom move along separate paths with the airstream effecting advancement of the foreign matter only and not the cotton.

Still another important object of the instant invention is to provide an anti-clog assembly for handling the foreign matter, operable to make use of the airstream as aforesaid and as the latter exhausts to the atmosphere, and effective in continually receiving the foreign matter separated from the cotton and delivering it to the airstream at the zone of air discharge.

Other objects include the provision of a novel means of mounting of saw bands forming a part of the cleaner and a highly advantageous manner of mounting the discs of the anticlog assembly on the rotatable shaft therefor.

In the drawings:

FIG. 1 is a fragmentary, vertical cross-sectional view of a combination cotton harvester and cleaner made pursuant to the present invention;

FIG. 4 is a cross-sectional view taken along line 4—4 of FIG. 2;

FIG. 8 is an enlarged fragmentary longitudinal cross-sectional view of a modified form of rotary grid;

FIG. 10 is a fragmentary plan view of one of the spacer members illustrated in FIGS. 8 and 9.

Figure 3:
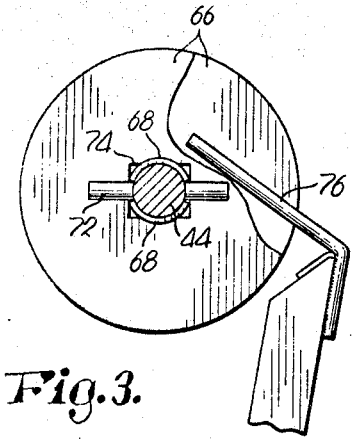
FIG. 3 is a cross-sectional view taken along line 3—3 of FIG. 2.
Figure 2:
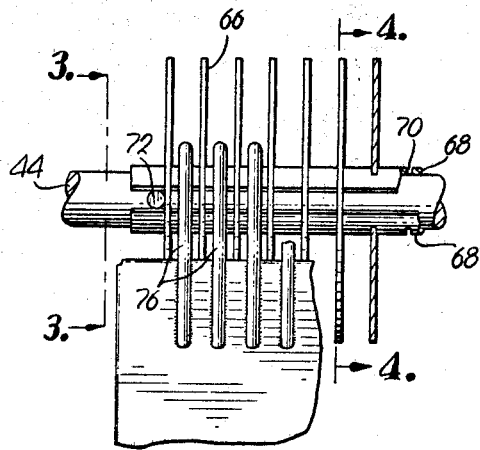
FIG. 2 is an enlarged fragmentary front elevational view of the rotary grid of the cleaner.

The cotton harvester of the instant invention includes an elevator 26 for discharging the picked cotton into an upwardly moving airstream in a duct 20 by a blower 24. The harvested material is discharged from duct 20 into a housing 28 and a bin 30 receives the clean cotton.

Housing 28 has an inlet 32 communicating with the upper end of duct 20. A swingable closure 34 for inlet 32 is illustrated in full lines in a position opening the inlet 32 to housing 28. A pair of identical saws 36 and 36a and a doffer 38 are rotatably mounted in housing 28.

An opening 40 in one side of housing 28 provides an outlet for the airstream emanating from duct 20. A door (not shown) for outlet 40 may be used under certain conditions as hereinafter explained. A cotton barrier in the form of a rotary grid 42 is disposed between saw 36 and outlet 40, the shaft 44 of grid 42 being parallel to the axes of rotation of doffer 38 and saws 36 and 36a.

The saw 36 is confined between an arcuate, overhead cowl segment 48 and an underlying, arcuate row of bars 50. The lower saw 36a is partially surrounded by an approximately semi-circular cage 52 in the form of a series of spaced bars beneath saw 36a and extending around the left-hand portion thereof. A flexible deflector 54 is mounted in housing 28 at the right end of cage 52 to direct gravitating cotton into the space between the periphery of the saw 36a and the cage 52.

Housing 28 is restricted in the space above doffer 38 and saw 36 to form an upwardly extending throat 58 that serves as a clean cotton outlet. The throat 58 communicates housing 28 with an overhead conduit 60 having a blower 62 at one end which directs air through conduit 60 to bin 30. A baffle 64 is mounted for swinging movement from its normal position illustrated in full lines to a second position illustrated in broken lines.

A plurality of plate-like elements in the nature of discs 66 form the grid structure of the cotton barrier or rotary grid 42, discs 66 being shown in FIGS. 1–4 attached to shaft 44 by a pair of elongated, transversely arcuate spacer members 68. Each member 68 has a plurality of spaced, transverse slots or notches 70 in the outer convex surface thereof, the members 68 forming a split sleeve which complementally engages shaft 44. The two members 68 are in diametrically opposed relationship and are held against movement relative to shaft 44 by cross pins 72 extending between members 68 and projecting radially outwardly from shaft 44.

Each of the discs 66 has a central, rectangular opening 74 permitting them to be received within notches 70. In the assembly of grid 42, the composite disc and spacer assembly is slipped on shaft 44 and cross pins 72 inserted, it being understood that at least one other cross pin (not shown) would also be utilized. Thus, rapid fabrication of the rotary structure 42 is facilitated, discs 66 are positively maintained in a predetermined spacial relationship, and the cross pins 72 preclude axial and rotational shifting of discs 66 on shaft 44.

A row of L-shaped rods 76 is mounted in housing 28 with each rod 76 extending between a pair of adjacent discs 66 to preclude lodging of trash in the grid structure 42. A trash receiver in the form of a removable trough 78 is mounted on opposed ledges 80 and receives trash removed from the grid by cleaner rods 76. Trough 78 extends from sidewall to sidewall within housing 28 and registers with the lower portion of outlet 40.

Figure 9:
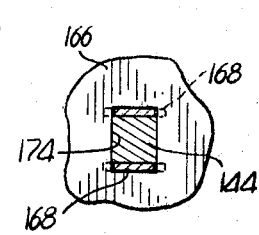
FIG. 9 is a cross-sectional view taken along line 9—9 of FIG. 8.

A second form of grid barrier 142 illustrated in FIGS. 8–10 has a shaft 144 provided with a polygonal cross-sectional configuration. Discs 166 have rectangular, central openings 174 through which a pair of spacer members in the form of elongated, flat strips 168 extend. Strips 168 are flush with opposed sides of shaft 144 and each of the longitudinal edges 200 of each strip 168 has a row of notches 202. The width of each strip 168 is greater than the corresponding transverse dimension of shaft 144, so that the opposed pairs of notches 202 of each strip 168 receive discs 166. The assembly of grid barrier 142 is similar to that as described above for the first embodiment, except that a crossbolt 204 connecting the two strips 168 to shaft 144 is employed to prevent relative movement of the strips and the shaft. Discs 166 are thus held in predetermined special relationship; a degree of flexibility may be provided if desired as illustrated by sizing the notches 202 to provide a notch with somewhat greater width than the thickness of disc 166, as is clear in FIG. 8.

Figure 5:
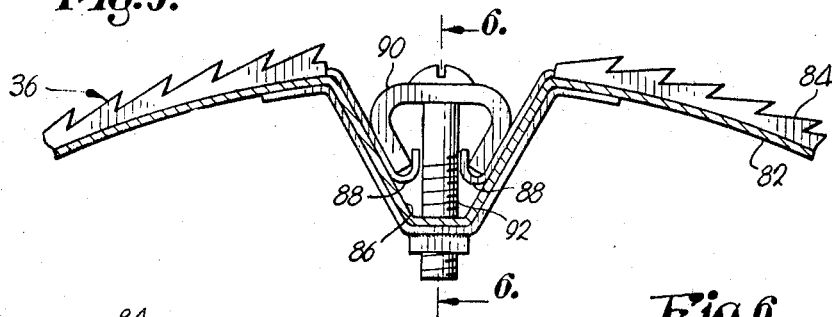
FIG. 5 is a cross-sectional view taken along line 5—5 of FIG. 7.
Figure 6:
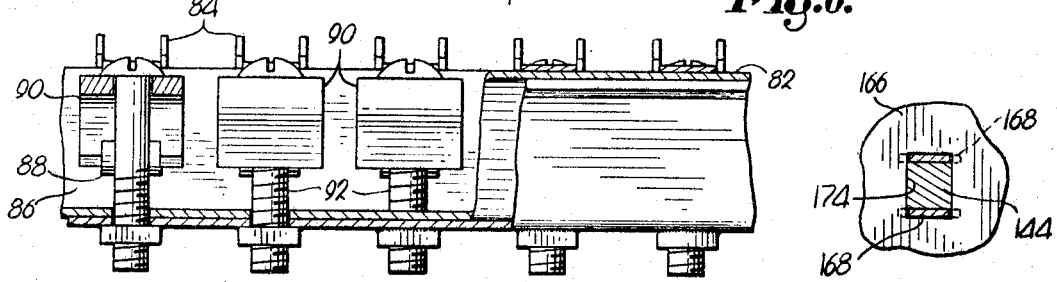
FIG. 6 is a cross-sectional view taken along line 6—6 of FIG. 5.
Figure 7:
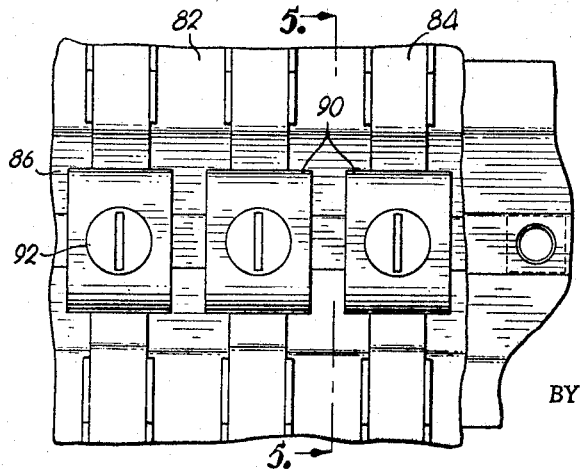
FIG. 7 is an enlarged, fragmentary, plan view of one of the rotary saws.

Saw 36 is shown in detail in FIGS. 5–7 and comprises a drum 82 mounted on axle 46 and a plurality of toothed bands 84 wrapped around the drum 82 and secured thereto. Drum 82 has a longitudinally extending recess 86 into which the ends 88 of each of the bands 84 extend. Bands 84 are transversely U-shaped presenting two circular rows of teeth.

A wedge 90 for each band 84 is utilized in conjunction with a drawbolt 92 to secure the band to the surface of drum 82. The ends 88 of each band are bent over to present a pair of hooks (FIG. 5) into which the legs of wedge 90 are inserted. The recess 86 is transversely V-shaped and wedge 90 is appropriately configured such that the recess 86 complementally receives the wedge 90, the latter thus clamping the ends 88 of the bands 84 into recess 86 as bolts 92 are tightened.

In operation, the upwardly moving airstream in duct 20 carries the harvested matter (cotton, trash and other foreign matter) entrained therein into housing 28 through inlet 32. Since the incoming airstream will seek a path to air outlet 40, the airstream flows through a passage 94 in housing 20 in which grid barrier 42 is directly interposed. The airstream is thus directed against the rotating saw 36 which defines a substantial portion of one boundary of passage 94, the teeth of saw 36 functioning to remove the cotton from the incoming material.

Since the discs 66 of grid barrier 42 are spaced sufficiently close to one another to preclude the passage of cotton therethrough, a collection zone for cotton and larger debris is formed directly beneath grid barrier 42 or upstream therefrom, whereas the air, dust and smaller particles of foreign matter flow through grid 42 and the outlet 40. From this collection zone cotton is removed by saw 36 and the trash is removed as barrier 42 rotates in the direction indicated, it being understood that much of the cotton will be blown directly against the saws without passing to the grid 42. The trash collecting on the edges of discs 66 at the underside of barrier 42 is carried to the topside of the barrier as the latter rotates whereupon the trash falls into trough 78 and thence is carried from the housing through outlet 40 by the airstream. The cleaner rods 76 positively prevent the lodging of trash in the grid which, of course, if permitted would ultimately clog the same.

The cotton which is not captured by saw 36 and some debris gravitate downwardly toward saw 36a and are fed between saw 36a and cage 52 by the action of deflector 54. The remaining cotton is thus removed by the lower saw 36a and the trash falls through cage 52 and is discharged through a downwardly extending trash duct 96. Doffer 38 acts against both of the saws; thus, the cotton from saws 36 and 36a is ultimately discharged into cotton outlet 58 where it becomes entrained in the airstream produced by blower 62 in conduit 60. The cleaned cotton is thus carried to bin 30 for storage.

In some instances, such as in early morning when the crop is wet with dew, it will not be desired to attempt cleaning of the picked cotton, in which case closure 34 and baffle 64 are shifted to their broken-line positions. Trough 78 is removed and air outlet 40 is closed. This provides a secondary passage 98 between duct 20 and bin 30 which bypasses the cleaner, the latter of which, together with the blower 62, not being used.

Having thus described the invention, what is claimed as new and desired to be secured by Letters Patent is:

1. In combination a grid comprising:
   a plurality of juxtaposed, spaced, plate-like elements, each having an opening therethrough;
   a shaft extending through said openings;
   a resilient elongated spacer member on said shaft extending longitudinally thereof and engaging the shaft along the length of the member;
   said member including a plurality of transversely extending slots spaced along the longitudinal extent thereof; and
   the assembled member and shaft extending through the openings of said plate-like elements with inner peripheral portions of said elements being received in respective ones of said slots, whereby to inhibit substantial movement of the elements axially of the shaft and to maintain the elements in spaced relationship with one another.

2. The invention of claim 1,
   said openings being polygonal in configuration,
   said shaft having a circular, cross-sectional configuration,
   said member being transversely arcuate and complementally engaging said shaft, whereby to present a convex outer surface,
   said surface having said slots therein, the slots extending transversely of the member and the shaft.

3. The invention of claim 2,
   there being a pair of said members disposed on said shaft in diametrically opposed relationship to each other; and
   a crosspiece between the members extending through said shaft and projecting radially therefrom.

4. The invention of claim 1,
   said openings being polygonal in configuration,
   said shaft having a polygonal, cross-sectional configuration,
   said member comprising a flat strip extending along one side of the shaft and provided with a longitudinal edge having said slots therein.

5. The invention of claim 4,
   there being a pair of said strips on opposed sides of said shaft; and
   a crosspiece extending through the shaft and said members, preventing movement of the latter with respect to the shaft.

References Cited

UNITED STATES PATENTS

| | | | |
|---|---|---|---|
| 402,065 | 4/1889 | Clark | 287—52.04 |
| 701,841 | 6/1902 | Chandler. | |
| 1,521,823 | 1/1925 | Martins | 287—52.04 |
| 2,346,444 | 4/1944 | Machlin et al. | |
| 2,804,968 | 9/1957 | Elliott et al. | 29—125 X |
| 3,069,918 | 12/1962 | Schultz | 287—52.04 X |
| 3,137,919 | 6/1964 | Lakin | 29—148.4 |
| 3,182,378 | 5/1965 | Shorner | 29—125 |
| 3,249,363 | 5/1966 | Chatfield. | |
| 3,431,616 | 3/1969 | Lewis | 29—125 X |
| 3,444,609 | 5/1969 | Neidhart et al. | 29—451 |

MORRIS KAPLAN, Primary Examiner

U.S. Cl. X.R.

19—202; 29—451, 148.4; 287—52.04